US009117120B2

(12) United States Patent
Alaniz et al.

(10) Patent No.: US 9,117,120 B2
(45) Date of Patent: Aug. 25, 2015

(54) FIELD OF VISION CAPTURE

(71) Applicants: Arthur Alaniz, Cupertino, CA (US); Fuminobu Kurosawa, San Jose, CA (US); Yoshiyuki Habashima, Redondo Beach, CA (US)

(72) Inventors: Arthur Alaniz, Cupertino, CA (US); Fuminobu Kurosawa, San Jose, CA (US); Yoshiyuki Habashima, Redondo Beach, CA (US)

(73) Assignee: Honda Motor Co., Ltd., Minato-Ku (JP)

( * ) Notice: Subject to any disclaimer, the term of this patent is extended or adjusted under 35 U.S.C. 154(b) by 138 days.

(21) Appl. No.: 13/902,590

(22) Filed: May 24, 2013

(65) Prior Publication Data
US 2014/0348377 A1 Nov. 27, 2014

(51) Int. Cl.
*G06K 9/00* (2006.01)
*G06F 3/00* (2006.01)

(52) U.S. Cl.
CPC .............. *G06K 9/00597* (2013.01); *G06F 3/00* (2013.01); *G06K 9/00355* (2013.01)

(58) Field of Classification Search
None
See application file for complete search history.

(56) References Cited

U.S. PATENT DOCUMENTS

| 5,517,021 | A | 5/1996 | Kaufman et al. | |
|---|---|---|---|---|
| 7,056,216 | B2 | 6/2006 | Ohshima | |
| 7,295,904 | B2 | 11/2007 | Kanevsky et al. | |
| 8,149,210 | B2 | 4/2012 | Klier et al. | |
| 8,214,098 | B2 | 7/2012 | Murray et al. | |
| 8,311,973 | B1 | 11/2012 | Zadeh | |
| 2003/0076299 | A1 | 4/2003 | Trajkovic | |
| 2006/0284839 | A1 | 12/2006 | Breed et al. | |
| 2008/0309764 | A1* | 12/2008 | Kubota et al. | 348/148 |
| 2009/0167679 | A1* | 7/2009 | Klier et al. | 345/157 |
| 2009/0237803 | A1* | 9/2009 | Hotta et al. | 359/630 |
| 2011/0032357 | A1* | 2/2011 | Kitaura et al. | 348/148 |
| 2012/0099195 | A1* | 4/2012 | Choi et al. | 359/466 |
| 2012/0169861 | A1* | 7/2012 | Szczerba et al. | 348/78 |
| 2012/0268294 | A1 | 10/2012 | Michaelis et al. | |
| 2012/0272179 | A1 | 10/2012 | Stafford | |
| 2012/0287284 | A1 | 11/2012 | Jacobsen et al. | |
| 2012/0327232 | A1 | 12/2012 | Yang et al. | |
| 2013/0002551 | A1 | 1/2013 | Imoto et al. | |
| 2013/0088428 | A1 | 4/2013 | Ting et al. | |
| 2013/0343607 | A1* | 12/2013 | Wilf et al. | 382/103 |

FOREIGN PATENT DOCUMENTS

JP 2006-090790 * 4/2006 ............ G01C 21/00

* cited by examiner

*Primary Examiner* — Amara Abdi
(74) *Attorney, Agent, or Firm* — Armstrong Teasdale LLP

(57) ABSTRACT

A system includes at least one sensor, and a computing device coupled to the at least one sensor. The computing device includes a processor, and a computer-readable storage media having computer-executable instructions embodied thereon. When executed by at least one processor, the computer-executable instructions cause the processor to identifying a dominant eye of the occupant, determine a first position associated with the dominant eye of the occupant, determine a second position associated with the occupant, and determine a first line-of-sight by extending a first line-of-sight between the first position and the second position.

17 Claims, 3 Drawing Sheets

FIELD OF VISION CAPTURE

BACKGROUND

The present disclosure relates to human-machine interface (HMI) systems and, more particularly, to methods and systems for determining a field of vision associated with an occupant of a vehicle.

At least some known HMI systems determine a line-of-sight associated with a user by detecting a position and an orientation of an eye of the user. However, determining the line-of-sight based on the position and the orientation of only the eye may be speculative and/or difficult because the line-of-sight is determined based on only one reference point (i.e., the user's eye).

BRIEF SUMMARY

In one aspect, a method is provided for determining a field of vision associated with an occupant of a vehicle. The method includes identifying a dominant eye of the occupant, determining a first position associated with a dominant eye of the occupant, determining a second position associated with the occupant, and determining a first line-of-sight by extending a first line-of-sight between the first position and the second position.

In another aspect, one or more computer-readable storage media are provided. The one or more computer-readable storage media has computer-executable instructions embodied thereon. When executed by at least one processor, the computer-executable instructions cause the processor to identify a dominant eye of the occupant, determine a first position associated with the dominant eye of the occupant, determine a second position associated with the occupant, and determine a first line-of-sight by extending a first line-of-sight between the first position and the second position.

In yet another aspect, a system is provided. The system includes at least one sensor, and a computing device coupled to the at least one sensor. The computing device includes a processor, and a computer-readable storage media having computer-executable instructions embodied thereon. When executed by at least one processor, the computer-executable instructions cause the processor to identify a dominant eye of the occupant, determine a first position associated with the dominant eye of the occupant, determine a second position associated with the occupant, and determine a first line-of-sight by extending a first line-of-sight between the first position and the second position.

The features, functions, and advantages described herein may be achieved independently in various embodiments of the present disclosure or may be combined in yet other embodiments, further details of which may be seen with reference to the following description and drawings.

Although specific features of various implementations may be shown in some drawings and not in others, this is for convenience only. Any feature of any drawing may be referenced and/or claimed in combination with any feature of any other drawing.

DETAILED DESCRIPTION OF THE INVENTION

The present disclosure relates to human-machine interface (HMI) systems and, more particularly, to methods and systems for determining a field of vision associated with an occupant of a vehicle. In one embodiment, a system includes at least one sensor, and a computing device coupled to the at least one sensor. The computing device includes a processor, and a computer-readable storage media having computer-executable instructions embodied thereon. When executed by at least one processor, the computer-executable instructions cause the processor to identify a dominant eye of the occupant, determine a first position associated with the dominant eye of the occupant, determine a second position associated with the occupant, and determine a first line-of-sight by extending a first line-of-sight between the first position and the second position.

As used herein, an element or step recited in the singular and preceded with the word "a" or "an" should be understood as not excluding plural elements or steps, unless such exclusion is explicitly recited. Furthermore, references to one "implementation" or one "embodiment" of the subject matter described herein are not intended to be interpreted as excluding the existence of additional implementations that also incorporate the recited features. The following detailed description of implementations consistent with the principles of the disclosure refers to the accompanying drawings. In the absence of a contrary representation, the same reference numbers in different drawings may identify the same or similar elements.

Figure 1:
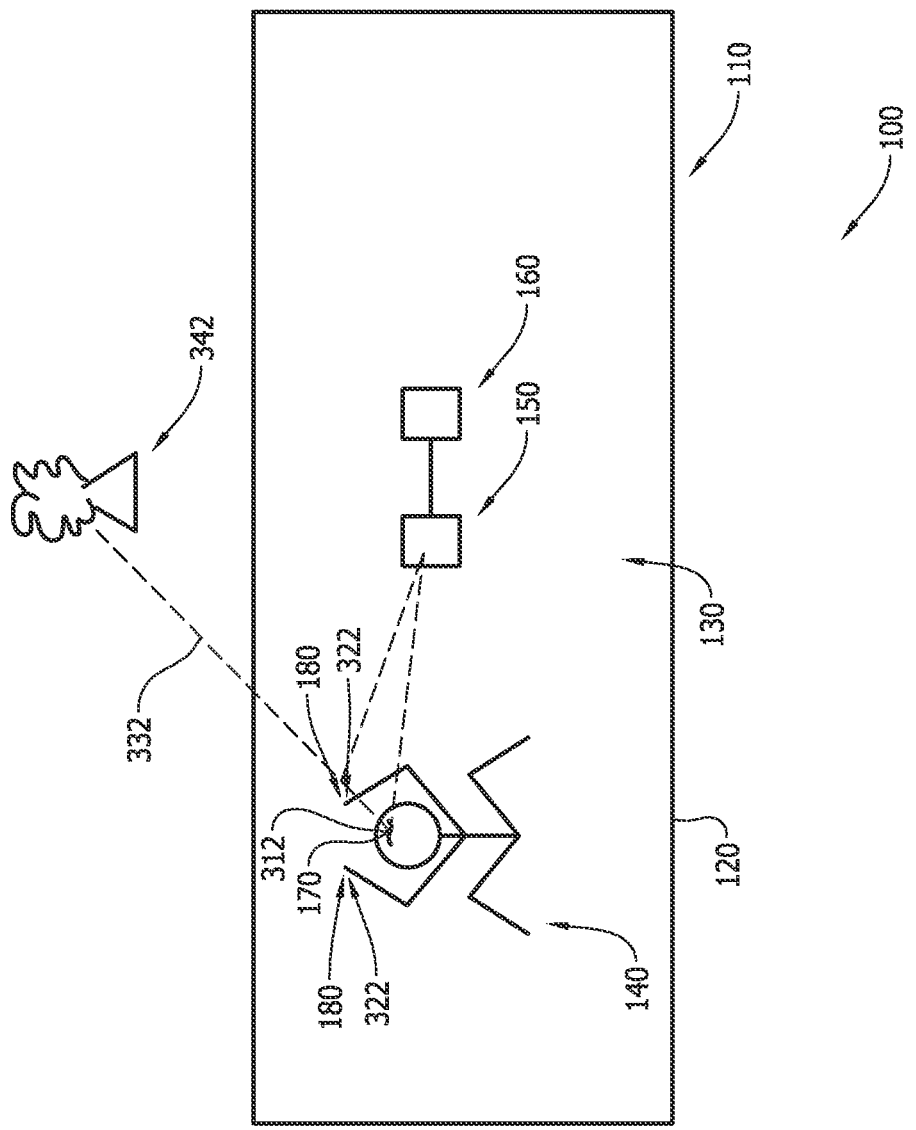
FIG. 1 is a schematic illustration of an exemplary human-machine interface (HMI) system environment.

FIG. 1 is a schematic illustration of an exemplary HMI system environment 100. In the exemplary embodiment, environment 100 includes a vehicle 110 including a frame 120 that defines a cabin 130 therein. Vehicle 110 may be any vessel, aircraft, and/or vehicle including, without limitation, an automobile, a truck, a boat, a helicopter, and/or an airplane. In at least some implementations, an occupant 140 (e.g., a drive or a passenger) may sit and/or be positioned within cabin 130.

In the exemplary embodiment, vehicle 110 includes at least one sensor 150 and a computing device 160 coupled to sensor 150. In the exemplary embodiment, sensor 150 is configured to detect a position of at least one part of occupant 140. For example, in one implementation, sensor 150 is oriented to detect an eye position 170 and/or a hand position 180 associated with occupant 140. As used herein, the term "eye position" may refer to a position and/or orientation of an eye, a cornea, a pupil, an iris, and/or any other part on the head that enables the methods and systems to function as described herein. As used herein, the term "hand position" may refer to a position and/or orientation of a hand, a wrist, a palm, a finger, a fingertip, and/or any other part adjacent to the end of an arm that enables the methods and systems to function as described herein. Any number of sensors 150 may be used to detect any number of parts of occupant 140 that enable the methods and systems to function as described herein. Additionally or alternatively, sensor 150 may be used to detect a prop, a stylus, and/or a wand associated with occupant 140.

Figure 2:
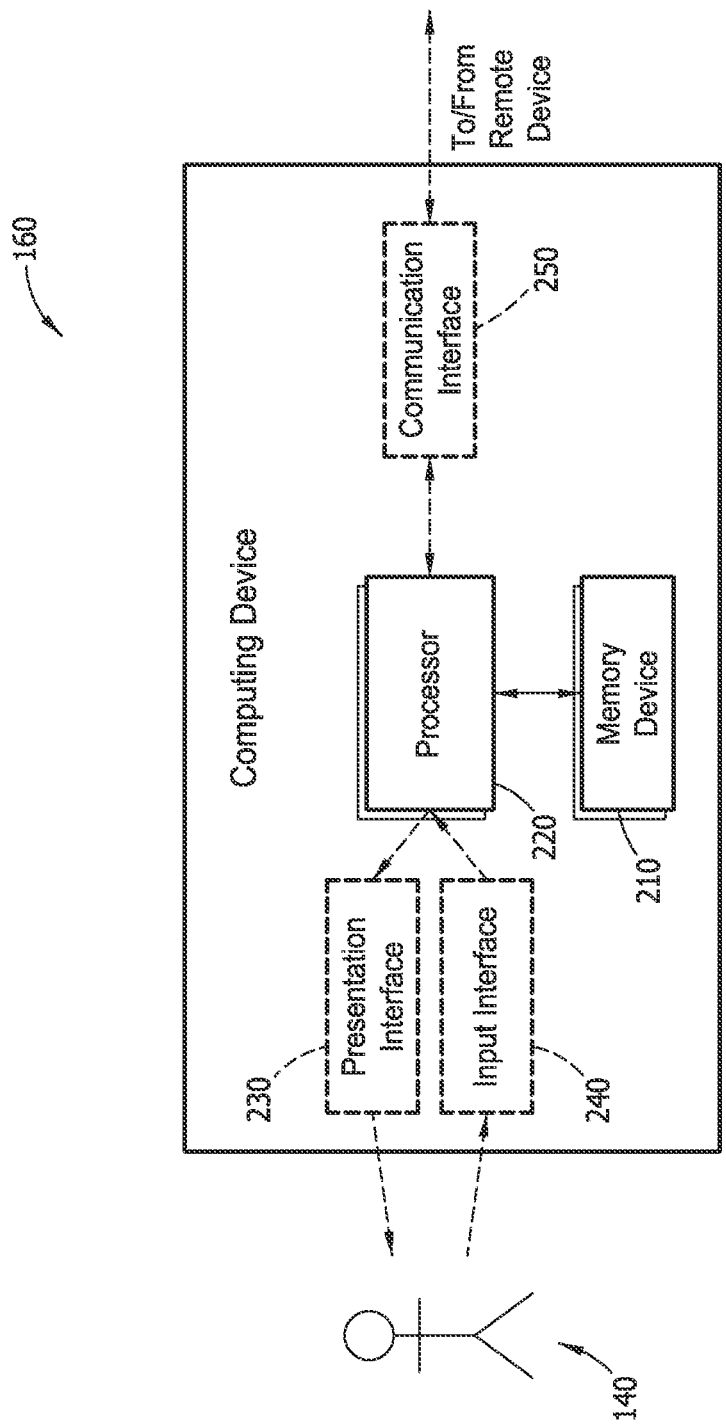
FIG. 2 is a schematic illustration of an exemplary computing device that may be used in the HMI system environment described in FIG. 1.

FIG. 2 is a schematic illustration of computing device 160. In the exemplary embodiment, computing device 160 includes at least one memory device 210 and a processor 220 that is coupled to memory device 210 for executing instructions. In some implementations, executable instructions are stored in memory device 210. In the exemplary embodiment, computing device 160 performs one or more operations described herein by programming processor 220. For example, processor 220 may be programmed by encoding an operation as one or more executable instructions and by providing the executable instructions in memory device 210.

Processor 220 may include one or more processing units (e.g., in a multi-core configuration). Further, processor 220 may be implemented using one or more heterogeneous processor systems in which a main processor is present with secondary processors on a single chip. In another illustrative example, processor 220 may be a symmetric multi-processor system containing multiple processors of the same type. Further, processor 220 may be implemented using any suitable programmable circuit including one or more systems and microcontrollers, microprocessors, reduced instruction set circuits (RISC), application specific integrated circuits (ASIC), programmable logic circuits, field programmable gate arrays (FPGA), and any other circuit capable of executing the functions described herein.

In the exemplary embodiment, memory device 210 is one or more devices that enable information such as executable instructions and/or other data to be stored and retrieved. Memory device 210 may include one or more computer readable media, such as, without limitation, dynamic random access memory (DRAM), static random access memory (SRAM), a solid state disk, and/or a hard disk. Memory device 210 may be configured to store, without limitation, application source code, application object code, source code portions of interest, object code portions of interest, configuration data, execution events and/or any other type of data.

In the exemplary embodiment, computing device 160 includes a presentation interface 230 that is coupled to processor 220. Presentation interface 230 is configured to present information to occupant 140 (shown in FIG. 1). For example, presentation interface 230 may include a display adapter (not shown) that may be coupled to a display device, such as a cathode ray tube (CRT), a liquid crystal display (LCD), an organic LED (OLED) display, and/or an "electronic ink" display. In some implementations, presentation interface 230 includes one or more display devices.

In the exemplary embodiment, computing device 160 includes a user input interface 240 that is coupled to processor 220. User input interface 240 is configured to receive input from occupant 140. User input interface 240 may include, for example, a keyboard, a pointing device, a mouse, a stylus, a touch sensitive panel (e.g., a touch pad or a touch screen), a gyroscope, an accelerometer, a position detector, and/or an audio user input interface. A single component, such as a touch screen, may function as both a display device of presentation interface 230 and user input interface 240.

Computing device 160, in the exemplary embodiment, includes a communication interface 250 coupled to processor 220. Communication interface 250 communicates with one or more remote devices, such as sensor 150 (shown in FIG. 1). To communicate with remote devices, communication interface 250 may include, for example, a wired network adapter, a wireless network adapter, and/or a mobile telecommunications adapter.

Figure 3:
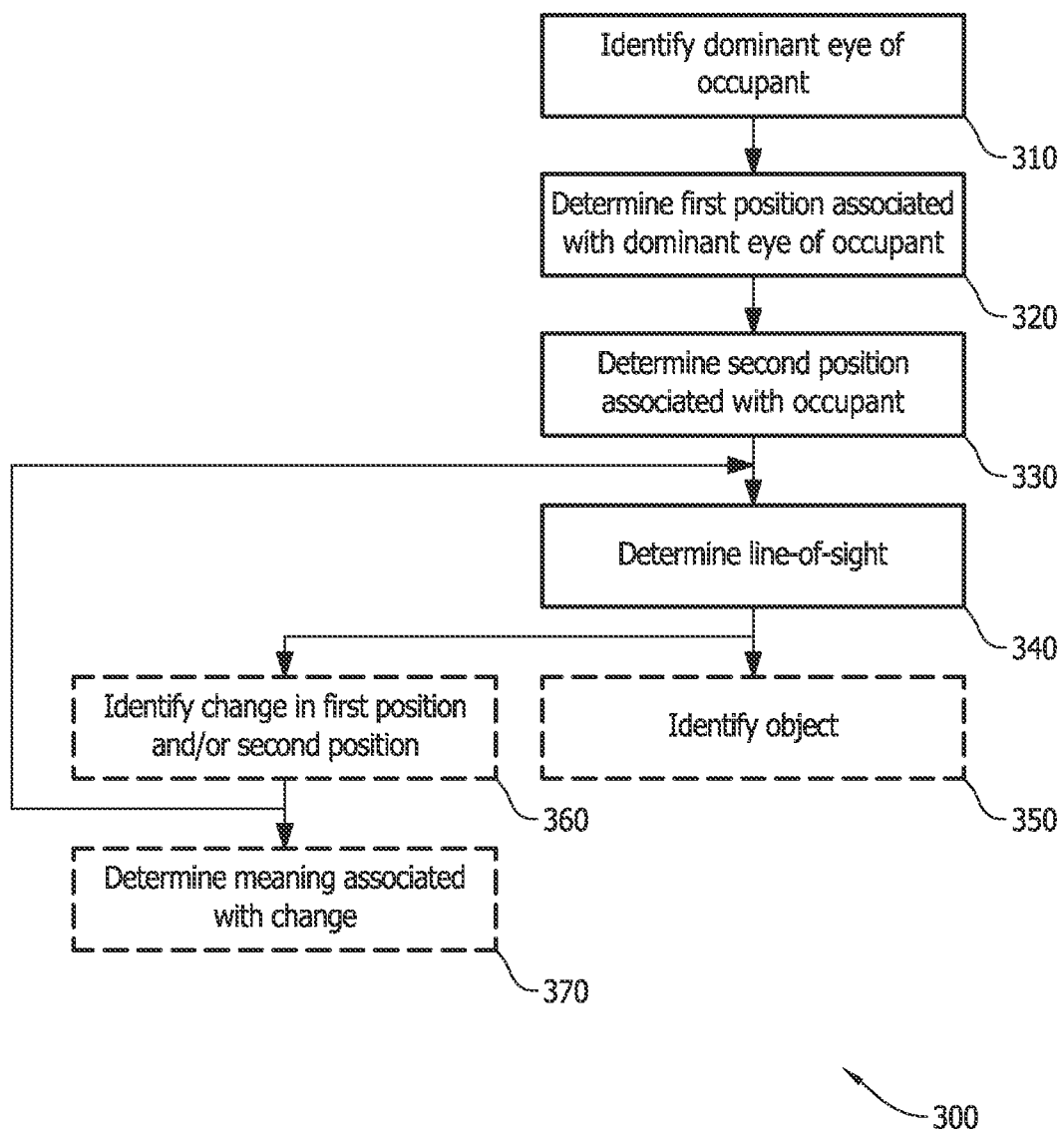
FIG. 3 is a flowchart of an exemplary method that may be implemented by the computing device shown in FIG. 2.

FIG. 3 is a flowchart of an exemplary method 300 that may be implemented by computing device 160 (shown in FIGS. 1 and 2). In the exemplary embodiment, a dominant eye of occupant 140 (shown in FIG. 1) is detected and/or identified 310. More specifically, in the exemplary embodiment, computing device 160 identifies 310 the dominant eye based at least partially on a signal transmitted by sensor 150 and/or received by computing device 160.

For example, in one implementation, the dominant eye may be detected by detecting a first parameter associated with a first eye of occupant 140, detecting a second parameter associated with a second eye of occupant 140, and determining which eye is the dominant eye based on the detected parameters. The dominant eye may be determined using any method and/or system including, without limitation, the Miles test, the Porta test, the Dolman method, a convergence near-point test, a stereogram, a pinhole test, a ring test, and/or a lens fogging technique. Additionally or alternatively, the dominant eye may be identified 310 based at least partially on user input and/or an algorithm or rule set stored in memory device 210.

In the exemplary embodiment, a first position 312 (shown in FIG. 1) associated with the dominant eye of occupant 140 is determined 320. For example, in one implementation, an eye position associated with occupant 140 is detected to determine 320 first position 312. Alternatively, any part of occupant 140 may be detected to determine first position 312 that enables the methods and systems to function as described herein. In at least some implementations, the first part is detected using a depth-sensing camera to enable three-dimensional coordinates for first position 312 to be determined.

In the exemplary embodiment, a second position 322 (shown in FIG. 1) associated with occupant 140 is determined 330. For example, in one implementation, a hand or, more specifically, a fingertip position associated with occupant 140 is detected to determine 330 second position 322. Alternatively, any part associated with occupant 140 including, without limitation, a body part, a prop, a stylus, and/or a wand may be detected to determine second position 322 that enables the methods and systems to function as described herein. In at least some implementations, the second part is detected using the depth-sensing camera (or another depth-sensing camera) to enable three-dimensional coordinates for second position 322 to be determined.

In the exemplary embodiment, a first line-of-sight 332 (shown in FIG. 1) is determined 340 based at least partially on the first position and the second position. For example, in one implementation, at least a portion of first line-of-sight 332 extends between first position 312 and second position 322. That is, in the exemplary embodiment, computing device 160 determines 340 that first line-of-sight 332 extends from the first position (e.g., the eye position) towards the second position (e.g., the fingertip position).

In the exemplary embodiment, an object 342 (shown in FIG. 1) outside vehicle 110 (shown in FIG. 1) is identified 350 as being in a field of vision of occupant 140 based at least partially on first line-of-sight 332. For example, in one implementation, first line-of-sight 332 is extrapolated from first position 312 beyond second position 322 to object 342. Accordingly, in such an implementation, a vector extends from first position 312, through second position 322, and points to object 342.

In at least some implementations, a change (not shown) in first position 312 and/or second position 322 is identified 360, and a second line-of-sight (not shown) is determined 340 based at least partially on first line-of-sight 332 and/or the change. For example, in one implementation, first line-of-sight 332 extends between first position 312 and second position 322 before the change, and the second line-of-sight extends between first position 312 and second position 322 after the change.

In at least some implementations, a change in first position 312 and/or second position 322 is identified 360, and a meaning associated with the change is determined 370. For example, in one implementation, the change is interpreted as a gesture that is associated with a predetermined meaning. In such an implementation, occupant 140 may interact with a virtual representation of object 342 by, for example, touching and/or twirling the fingertip.

The methods and systems described herein may be implemented using computer programming or engineering techniques including computer software, firmware, hardware or any combination or subset thereof, wherein the technical effects may be achieved by performing at least one of the following steps: a) determining a first position associated with a first part of the occupant; b) determining a second position associated with a second part of the occupant; and/or c) determining a first line-of-sight based at least partially on the first position and the second position.

The present disclosure relates generally to HMI systems and, more particularly, to methods and systems for determining a field of vision associated with an occupant of a vehicle. Accordingly, the methods and systems described herein facilitate determining and/or identifying objects in a field of vision for each occupant of a vehicle based on a respective eye position, head position, hand position, and/or fingertip position.

Exemplary embodiments of a HMI system are described above in detail. The methods and systems are not limited to the specific embodiments described herein, but rather, components of systems and/or steps of the method may be utilized independently and separately from other components and/or steps described herein. Each method step and each component may also be used in combination with other method steps and/or components. Although specific features of various embodiments may be shown in some drawings and not in others, this is for convenience only. Any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of determining a field of vision associated with an occupant of a vehicle, the method comprising:
   identifying a dominant eye of the occupant;
   determining a first position associated with the dominant eye of the occupant;
   determining a second position associated with the occupant;
   determining a set of three-dimensional coordinates for each of the first position and the second position;
   determining a first line-of-sight by extending a first line between the first position and the second position based on the three-dimensional coordinates for each of the first position and the second position; and
   identifying an object outside the vehicle as being in the field of vision based at least partially on the first line-of-sight by extrapolating the first line-of-sight beyond the second position and outside the vehicle to the object located outside the vehicle.

2. A method in accordance with claim 1, wherein identifying a dominant eye further comprises:
   detecting a first parameter associated with a first eye of the occupant;
   detecting a second parameter associated with a second eye of the occupant; and
   determining the dominant eye based at least partially on the first parameter and the second parameter.

3. A method in accordance with claim 1, wherein determining a first position further comprises detecting, using at least one depth-sensing camera, an eye position associated with the occupant.

4. A method in accordance with claim 1, wherein determining a second position further comprises detecting, using at least one depth-sensing camera, a hand position associated with the occupant.

5. A method in accordance with claim 1 further comprising:
   identifying a change in one of the first position and the second position; and
   determining a second line-of-sight based at least partially on one of the first line-of-sight and the change.

6. A method in accordance with claim 1 further comprising:
   identifying a change in one of the first position and the second position; and
   determining a meaning associated with the change.

7. One or more non-transitory computer-readable storage media having computer-executable instructions embodied thereon, wherein, when executed by at least one processor, the computer-executable instructions cause the processor to:
   identify a dominant eye of an occupant of a vehicle;
   determine a first position associated with the dominant eye of the occupant;
   determine a second position associated with the occupant;
   determine a set of three-dimensional coordinates for each of the first position and the second position;
   determine a first line-of-sight by extending a first line between the first position and the second position based on the three-dimensional coordinates for each of the first position and the second position; and
   identify an object outside the vehicle as being in a field of vision of the occupant based at least partially on the first line-of-sight by extrapolating the first line-of-sight beyond the second position and outside the vehicle to the object located outside the vehicle.

8. One or more computer-readable storage media in accordance with claim 7, wherein the computer-executable instructions further cause the processor to:
   detect a first parameter associated with a first eye of the occupant;
   detect a second parameter associated with a second eye of the occupant; and
   determine the dominant eye based at least partially on the first parameter and the second parameter.

9. One or more computer-readable storage media in accordance with claim 7, wherein the computer-executable instructions further cause the processor to detect, using at least one depth-sensing camera, an eye position associated with the occupant.

10. One or more computer-readable storage media in accordance with claim 7, wherein the computer-executable instructions further cause the processor to detect, using at least one depth-sensing camera, a hand position associated with the occupant.

11. One or more computer-readable storage media in accordance with claim 7, wherein the computer-executable instructions further cause the processor to:

identify a change in one of the first position and the second position; and determine a second line-of-sight based at least partially on one of the first line-of-sight and the change.

12. One or more computer-readable storage media in accordance with claim 7, wherein the computer-executable instructions further cause the processor to:

identify a change in one of the first position and the second position; and determine a meaning associated with the change.

13. A system comprising:

at least one sensor; and a computing device coupled to the at least one sensor, the computing device comprising a processor, and a computer-readable storage media having computer-executable instructions embodied thereon, wherein, when executed by at least one processor, the computer-executable instructions cause the processor to:

identify a dominant eye of an occupant of a vehicle;

determine a first position associated with the dominant eye of the occupant;

determine a second position associated with the occupant;

determine a set of three-dimensional coordinates for each of the first position and the second position;

determine a first line-of-sight by extending a first line between the first position and the second position based on the three-dimensional coordinates for each of the first position and the second position; and identify an object outside the vehicle as being in a field of vision of the occupant based at least partially on the first line-of-sight by extrapolating the first line-of-sight beyond the second position and outside the vehicle to the object located outside the vehicle.

14. A system in accordance with claim 13, wherein the computer-executable instructions further cause the processor to:

detect, using the at least one sensor, a first parameter associated with a first eye of the occupant;

detect, using the at least one sensor, a second parameter associated with a second eye of the occupant; and determine the dominant eye based at least partially on the first parameter and the second parameter.

15. A system in accordance with claim 13, wherein the computer-executable instructions further cause the processor to detect, using the at least one sensor, at least one of an eye position and a hand position associated with the occupant, wherein the at least one sensor is a depth-sensing camera.

16. A system in accordance with claim 13, wherein the computer-executable instructions further cause the processor to:

identify a change in one of the first position and the second position; and determine a second line-of-sight based at least partially on one of the first line-of-sight and the change.

17. A system in accordance with claim 13, wherein the computer-executable instructions further cause the processor to:

identify a change in one of the first position and the second position; and determine a meaning associated with the change.

* * * * *